United States Patent
Li et al.

(10) Patent No.: US 11,010,312 B2
(45) Date of Patent: May 18, 2021

(54) SECURITY SYSTEM AND METHOD OF STORED DATA

(71) Applicant: VIA TECHNOLOGIES, INC., New Taipei (TW)

(72) Inventors: Nan Hui Li, New Taipei (TW); Neng-An Kuo, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 16/239,713

(22) Filed: Jan. 4, 2019

(65) Prior Publication Data

US 2020/0073828 A1    Mar. 5, 2020

Related U.S. Application Data

(60) Provisional application No. 62/726,483, filed on Sep. 4, 2018.

(30) Foreign Application Priority Data

Oct. 29, 2018 (TW) ................................. 107214648

(51) Int. Cl.
| | | |
|---|---|---|
| G06F 21/60 | (2013.01) |
| G06F 12/14 | (2006.01) |
| G06F 21/62 | (2013.01) |
| H04L 9/08 | (2006.01) |
| H04L 9/06 | (2006.01) |
| G06F 21/78 | (2013.01) |

(52) U.S. Cl.
CPC ........ *G06F 12/1466* (2013.01); *G06F 21/604* (2013.01); *G06F 21/6218* (2013.01); *G06F 21/78* (2013.01); *H04L 9/0643* (2013.01); *H04L 9/0869* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 7,478,248 B2* | 1/2009 | Ziv | ...................... | G06F 12/1466 |
| | | | | 711/164 |
| 7,480,805 B1* | 1/2009 | Gnech | ..................... | G06F 21/31 |
| | | | | 713/182 |
| 7,552,345 B2* | 6/2009 | Chang | ..................... | G06F 21/34 |
| | | | | 713/193 |
| 2001/0039620 A1* | 11/2001 | Berry | ...................... | G06F 21/62 |
| | | | | 713/193 |
| 2001/0042054 A1* | 11/2001 | Dietrich | ............. | G07B 17/0008 |
| | | | | 705/405 |
| 2004/0025027 A1* | 2/2004 | Balard | .................... | G06F 21/31 |
| | | | | 713/183 |

(Continued)

*Primary Examiner* — Elias Mamo
(74) *Attorney, Agent, or Firm* — WPAT, PC

(57) ABSTRACT

A security system and a security method of stored data are provided. In the security system and the security method, a central processing unit performs hashing operation on a seed code to generate a data access code, which is then compared with a password stored in a storage device. If there is no password in the storage device, the data access code is written into the storage device as the password. On the other hand, if the data access code does not match the password, the storage device denies the access request from the central processing unit.

9 Claims, 2 Drawing Sheets

(56) References Cited

U.S. PATENT DOCUMENTS

| | | | |
|---|---|---|---|
| 2008/0155275 A1* | 6/2008 | Natarajan | G06F 12/1408 713/193 |
| 2013/0013854 A1* | 1/2013 | Mun | G11C 16/0483 711/103 |
| 2018/0114387 A1* | 4/2018 | Klink | H04W 12/02 |

* cited by examiner

SECURITY SYSTEM AND METHOD OF STORED DATA

CROSS-REFERENCE TO RELATED APPLICATIONS

The present application is a nonprovisional application claiming benefit from a prior-filed provisional application bearing a Ser. No. 62/726,483 and filed Sep. 4, 2018, the entity of which is incorporated herein for reference.

FIELD OF THE INVENTION

The present disclosure relates to a system and a method for data storage, and particularly to a security system and a security method for data stored in a storage device to prevent from unauthorized access.

BACKGROUND OF THE INVENTION

Electronic devices have been widely used in our daily life. Meanwhile, electronic data are replacing paper in storage field. As a result, more and more electronic files instead of written documents are generated. Although the electronic files are space-saving and easy to be preserved, new trouble follows. For example, personal data stored in the storage device may be stolen through invalid access to seriously invade one's privacy. Therefore, it is an important issue to protect the data to prevent from unauthorized access.

SUMMARY OF THE INVENTION

The present disclosure provides a security system and a security method of stored data to reduce possibility of data leakage due to unauthorized access to a storage device.

An aspect of the present disclosure provides a security system of stored data. The security system includes a server and a storage device. The server includes a non-volatile storage unit for storing a seed code; a central processing unit electrically coupled to the non-volatile storage unit for retrieving the seed code from the non-volatile storage unit; and a storage device port electrically coupled to the central processing unit. The storage device is adapted to be electrically coupled to the storage device port to communicate with the server through the storage device port. The storage device includes a data-locking block for storing a password and a lock flag. The central processing unit performs hashing operation on the seed code to generate a data access code, and transmits the data access code to the storage device through the storage device port. Then, the storage device compares the data access code with the password to decide whether to enable locking function for the data stored in the storage device.

In an embodiment, if there is no password in the data-locking block, the storage device writes the data access code into the data-locking block as the password and sets the lock flag to enable the locking function.

In an embodiment, if the password stored in the data-locking block is not identical to the data access code, the storage device denies access from the central processing unit.

In an embodiment, the storage device is a hard disk or a memory card, especially a CompactFlash card.

Another aspect of the present disclosure provides a security method used with the above-described security system. In the security method, a seed code is generated and stored in the non-volatile storage unit. The central processing unit of the server retrieves the seed code from the non-volatile storage unit. Then, the central processing unit performs hashing operation on the seed code to generate the data access code, and transmits the data access code to the storage device through the storage device port. Afterwards, the storage device compares the data access code with the password to decide whether to enable the locking function for the data stored in the storage device.

In an embodiment, if the password stored in the data-locking block is identical to the data access code, the storage device sets the lock flag to disable the locking function to allow the central processing unit to access the stored data.

In an embodiment, the seed code is a random number generated by the central processing unit.

In an embodiment, the security method further includes a step of setting the lock flag to enable the locking function before turning off or rebooting the security system.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
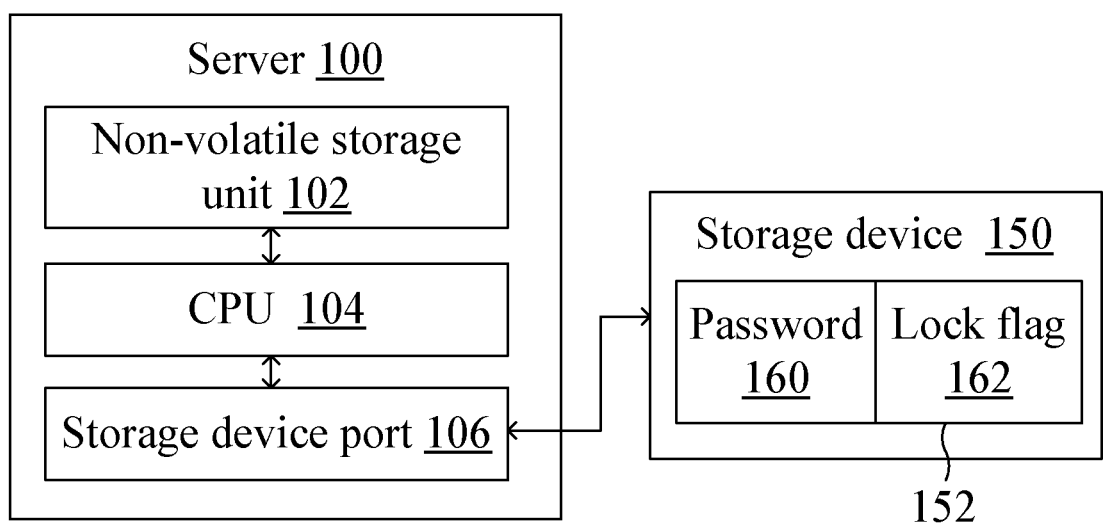
FIG. 1 is a schematic diagram illustrating an architecture of a security system of stored data according to an embodiment of the present disclosure.

Please refer to FIG. 1, a schematic diagram illustrating an architecture of a security system of stored data according to an embodiment of the present disclosure. In the description, the security system 10 of stored data includes a server 100 and a storage device 150. Although only one storage device 150 is shown, it is to be noted that the server 100 can be in communication with more than one storage device 150 to perform simultaneous operation or time-sharing operation to meet specific requirements. The quantity of the storage device 150 is not an essential condition for the present disclosure.

As shown in FIG. 1, the server 100 includes a non-volatile storage unit 102, a central processing unit (CPU) 104 and a storage device port 106. The storage device 150 includes a data-locking block 152 configured to store a password 160 and a lock flag 162. The password 160 stored in the data-locking block 152 is used to determine whether an access instruction transmitted to the storage device 150 is issued by an authorized client. If the lock flag 162 stored in the data-locking block 152 is set to enable locking function, the storage device 150 is locked and no access is allowed.

In the embodiment, the non-volatile storage unit 102 is electrically coupled to the central processing unit 104 and configured to store a seed code, which is a random number generated by the central processing unit 104. The seed code is provided to the central processing unit 104 upon a request from the central processing unit 104. The central processing unit 104 is electrically coupled to the non-volatile storage unit 102 and the storage device port 106. When there is no seed code stored in the non-volatile storage unit 102, the central processing unit 104 randomly generates a seed code, and the seed code is sent to and stored in the non-volatile storage unit 102. When there is a seed code stored in the non-volatile storage unit 102, the central processing unit 104 can retrieve the seed code from the non-volatile storage unit 102, performs hashing operation on the seed code to generate a data access code, and transmits the data access code to the storage device port 106. The storage device port 106 is electrically coupled to the central processing unit 104 and adapted to be electrically coupled to the storage device 150 so that the storage device 150 can be in communication with the server 100 (particularly the central processing unit 104) through the storage device port 106. Thus, the data access code can be transmitted from the central processing unit 104 to the storage device 150 through the storage device port 106.

The storage device 150 usually includes a basic processing unit (not shown). Upon receiving the data access code through the storage device port 106, the storage device 150 transmits the data access code to the processing unit first. When the processing unit receives the data access code, the processing unit retrieves the password 160 from the data-locking block 152, and decides the subsequent action according to a comparison result between the password 160 and the data access code.

In particular, the storage device 150 determines whether a password has been stored in the data-locking block 152 before requesting the password 160 from the data-locking block 152. If the data-locking block 152 indicates that no password is stored therein, the processing unit directly writes the received data access code into the data-locking block 152 as the password 160, and sets the lock flag 162 to enable locking function. On the contrary, on condition that the password 160 exists, after the processing unit of the storage device 150 retrieves the password 160 from the data-locking block 152, the processing unit judges whether the received data access code is identical to the retrieved password 160. If the data access code is identical to the password 160, the processing unit sets and changes the lock flag 160 to disable the locking function. Therefore, access to the storage device 150 is allowed. If the data access code is not identical to the password 160, the lock flag 160 is not changed (i.e. remaining the locking function) so that the access to the storage device 150 is denied.

According to the present disclosure, the storage device 150 is locked and data stored in the storage device 150 can not be accessed after the first password-writing procedure. On condition that the lock flag 162 is set to "enabled", if someone desires to access the data stored in the storage device 150 through other device, correct password is required. Therefore, the security system 10 of stored data according to the present disclosure can reduce possibility of data leakage due to unauthorized access to the storage device 150.

Figure 2:
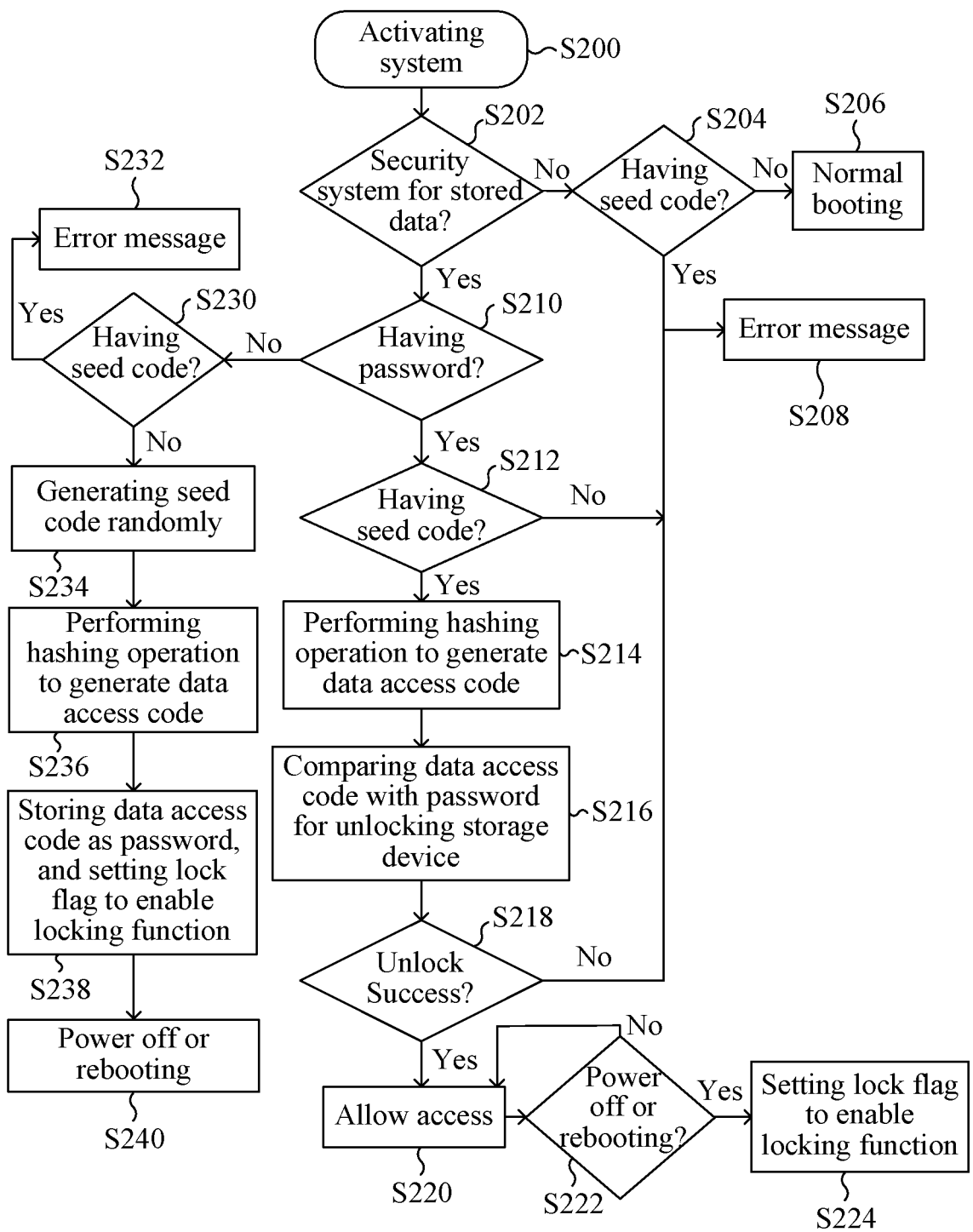
FIG. 2 is a flowchart illustrating a security method performed by the security system of stored data according to an embodiment of the present disclosure.

A security method performed by the security system 10 of stored data is described in detail with reference to FIG. 1 and FIG. 2. FIG. 2 is a flowchart illustrating a security method performed by the security system according to an embodiment of the present disclosure. As shown in FIG. 2, after the system is activated (involving cold boot and warm boot, step S200), the central processing unit 104 determines whether the current system is a security system of stored data first (step S202). For example, the determination is made by reading data stored in the basic input/output system (BIOS) or other operation. The related operation can be achieved according to known technologies and is not given herein.

If it is determined in step S202 that the current system is not a security system of stored data, the central processing unit 104 further checks whether a seed code is found in the non-volatile storage unit 102 (step S204). If there is no seed code in the non-volatile storage unit 102, it represents that the current system is a usual system and a normal booting procedure follows (step S206). Otherwise, if it is found that a seed code is stored in the non-volatile storage unit 102, it represents that the running system is not fully compatible with current hardware. A corresponding error message pops up and the security method terminates to prevent from unpredictable error (step S208).

If it is determined in step S202 that the current system is a security system of stored data, the central processing unit 104 conducts an access test on the storage device 150 to judge whether a password 160 is stored in the storage device 150 (step S210). If a password has been stored in the storage device 150, the central processing unit 104 further checks whether a seed code is stored in the non-volatile storage unit 102 (step S212). If it is found in step S212 that there is no seed code in the non-volatile storage unit 102, it represents that the security system 10 and the security method did not successfully work in the last operation. Hence, a corresponding error message pops up and the security method terminates to prevent from unpredictable error (step S208). Otherwise, if it is found in step S212 that a seed code is stored in the non-volatile storage unit 102, the central processing unit 104 retrieves the seed code from the non-volatile storage unit 102 and performs hashing operation on the seed code to generate a corresponding data access code (step S214). Then, the data access code and the password 160 are compared for the purposes of unlocking the storage device 150 (step S216). After step S216, if the unlocking step fails (e.g. lock flag 162 is set to "enabled"), step S218 directs the security method to step S208 to show a corresponding error message. On the contrary, if the unlocking step succeeds, the access to the storage device 150 is allowed. Therefore, the security system 10 can access the data stored in the storage device 150 as required (step S220). After step S220, once the security system 10 is turned off or rebooted, the lock flag 162 in the storage device 150 is reset to enable the locking function so as to restart access protection for the storage device 150 (step S224).

On the other hand, if it is found in step S210 that no password 160 is stored in the storage device 150, the central processing unit 104 also checks whether a seed code is stored in the non-volatile storage unit 102 (step S230). If it confirms that a seed code exists in the non-volatile storage unit 102, it represents that the security system 10 and the security method did not successfully work in the last operation. Hence, a corresponding error message pops up and the security method terminates to prevent from unpredictable error (step S232).

If it is determined in step S230 that there is no seed code in the non-volatile storage unit 102, the central processing unit 104 generates a seed code by a random number generator or a random function, and then stores the seed code in the non-volatile storage unit 102 (step S234). After retrieving the seed code, the central processing unit 104 performs hashing operation on the seed code to generate a corresponding data access code (step S236), and sends the data access code to the storage device 150. The data access code is stored in the storage device 150 as a password 160, and the lock flag 162 is set to enable locking function (step S238).

At this time, the storage device 150 has been put under access protection (access is not permitted). Then, the security system 10 is powered off or rebooted (step S240), and security of and access to the storage device 150 can be ensured and controlled by following the steps in FIG. 2 from the start.

The above description deals with communication between one server 100 and one storage device 150. When more than one storage device 150 are present in this security system 10, each storage device 150 should correspond to a unique seed code. Thus, access control for each storage device 150 can be correctly and effectively performed in different conditions. The non-volatile storage unit 102 may be a BIOS memory or other separate memory unit. The storage device 150 involves any known storage device with data-locking block 152 or data-locking function, e.g. various kinds of hard disks and memory cards, especially CompactFlash (CF) card.

In conclusion, in the security system and the security method of the present disclosure, the central processing unit performs hashing operation on the seed code to generate the data access code, which is compared with the password stored in the storage device. If there is no password in the storage device, the data access code is written into the storage device as the password. On the other hand, if the data access code does not match the password, the storage device denies the access request from the central processing unit and disables the access function of the storage device. Hence, the security system and security method can reduce possibility of data leakage due to unauthorized access to the storage device.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A security system of stored data, comprising:
   a server, comprising:
      a non-volatile storage unit for storing a seed code;
      a central processing unit electrically coupled to the non-volatile storage unit,
      the central processing unit generating a random number serving as the seed code, storing the seed code in the non-volatile storage unit, and retrieving the seed code from the non-volatile storage unit; and
      a storage device port electrically coupled to the central processing unit; and
   a storage device adapted to be electrically coupled to the storage device port to communicate with the server through the storage device port, the storage device comprising a data-locking block for storing a password and a lock flag,
   wherein the central processing unit of the server performs hashing operation on the seed code to generate a data access code, and transmits the data access code to the storage device through the storage device port of the server, the storage device comparing the data access code with the password to decide whether to enable locking function for the data stored in the storage device, wherein when there is no password in the data-locking block, the storage device writes the data access code into the data-locking block as the password and sets the lock flag to enable the locking function to deny access to the data stored in the storage device.

2. The security system according to claim 1, wherein when the password stored in the data-locking block is not identical to the data access code, the storage device denies access from the central processing unit.

3. The security system according to claim 1, wherein the storage device is a hard disk.

4. The security system according to claim 1, wherein the storage device is a memory card.

5. The security system according to claim 4, wherein the storage device is a CompactFlash card.

6. A security method used with the security system of claim 1, comprising steps of:
   the central processing unit of the server generating the random number serving as the seed code, and storing the seed code in the non-volatile storage unit;
   the central processing unit of the server retrieving the seed code from the non-volatile storage unit;
   the central processing unit of the server performing hashing operation on the seed code to generate the data access code, and transmitting the data access code to the storage device through the storage device port of the server; and
   the storage device comparing the data access code with the password to decide whether to enable the locking function for the data stored in the storage device, wherein when there is no password in the data-locking block, the storage device writes the data access code into the data-locking block as the password and sets the lock flag to enable the locking function to deny access to the data stored in the storage device.

7. The security method according to claim 6, wherein when the password stored in the data-locking block is not identical to the data access code, the storage device denies access from the central processing unit.

8. The security method according to claim 6, wherein when the password stored in the data-locking block is identical to the data access code, the storage device sets the lock flag to disable the locking function to allow the central processing unit to access the stored data.

9. The security method according to claim 6, further comprising a step of setting the lock flag to enable the locking function before turning off or rebooting the security system.

* * * * *